US012371868B2

(12) United States Patent
Zeng et al.

(10) Patent No.: US 12,371,868 B2
(45) Date of Patent: Jul. 29, 2025

(54) ECO-FRIENDLY HIGH-PERFORMANCE ALL-SOLID-WASTE SOIL-BINDING MATERIAL AND PREPARATION METHOD AND USE METHOD THEREOF

(71) Applicant: Foshan Transportation Science and Technology Co., Ltd., Guangdong (CN)

(72) Inventors: Guodong Zeng, Guangdong (CN); Ben'an Shu, Guangdong (CN); Tengyu Yang, Guangdong (CN); Yanfei Ren, Guangdong (CN); Maocong Zhu, Guangdong (CN); Keyi Qiu, Guangdong (CN); Bing Qiu, Guangdong (CN); Jiangang Chen, Guangdong (CN); Junhao Lin, Guangdong (CN)

(73) Assignee: Foshan Transportation Science and Technology Co., Ltd., Foshan (CN)

( * ) Notice: Subject to any disclaimer, the term of this patent is extended or adjusted under 35 U.S.C. 154(b) by 0 days.

(21) Appl. No.: 18/940,891

(22) Filed: Nov. 8, 2024

(65) Prior Publication Data
US 2025/0154738 A1 May 15, 2025

(30) Foreign Application Priority Data

Nov. 10, 2023 (CN) .......................... 202311495439.1

(51) Int. Cl.
*E02D 3/12* (2006.01)
*B09B 3/25* (2022.01)
*B09B 101/16* (2022.01)
*C04B 111/00* (2006.01)
*C09K 17/08* (2006.01)

(52) U.S. Cl.
CPC ................ *E02D 3/126* (2013.01); *B09B 3/25* (2022.01); *B09B 2101/16* (2022.01); *C04B 2111/00732* (2013.01); *C09K 17/08* (2013.01)

(58) Field of Classification Search
CPC .. E02D 3/12; E02D 3/126; B09B 3/25; B09B 2101/16; C04B 2111/00732; C09K 17/08
See application file for complete search history.

(56) References Cited

U.S. PATENT DOCUMENTS

| 11,180,414 | B1* | 11/2021 | Shahsavari | C04B 14/30 |
| 2002/0026884 | A1* | 3/2002 | Raad | C08L 95/00 |
| | | | | 106/661 |
| 2022/0235268 | A1* | 7/2022 | Wang | C04B 14/102 |
| 2023/0212074 | A1* | 7/2023 | Sha | C04B 28/02 |
| | | | | 405/150.2 |

FOREIGN PATENT DOCUMENTS

| CN | 108751907 | A | 11/2018 |
| CN | 109095877 | A | 12/2018 |
| CN | 109369098 | A | 2/2019 |
| CN | 112266229 | A | 1/2021 |
| CN | 113956008 | A | 1/2022 |
| CN | 114409327 | A | 4/2022 |
| CN | 114804807 | A | 7/2022 |
| CN | 116675479 | A | 9/2023 |
| KR | 102133152 | B1 | 7/2020 |

OTHER PUBLICATIONS

Notice of Allowance of counterpart Chinese Patent Application No. 202311495439.1 issued on May 22, 2024.
Supplementary Search Report of counterpart Chinese Patent Application No. 202311495439.1 issued on May 20, 2024.
1st Office Action of counterpart Chinese Patent Application No. 202311495439.1 issued on Apr. 16, 2024.
First Search Report of counterpart Chinese Patent Application No. 202311495439.1 issued on Apr. 15, 2024.

* cited by examiner

Primary Examiner — Carib A Oquendo

(57) ABSTRACT

The present disclosure provides an eco-friendly high-performance all-solid-waste soil-binding material and a preparation method and use method thereof, and relates to the field of weak soil solidifying agents. The eco-friendly high-performance all-solid-waste soil-binding material includes the following components in parts by weight: a slag powder: 30 parts to 60 parts, a fly ash: 10 parts to 25 parts, a steel-slag powder: 10 parts to 30 parts, an alkaline residue powder: 5 parts to 15 parts, and a lithium-battery solid waste: 5 parts to 15 parts. The implementation of the present disclosure can improve a solidification strength of the soil-binding material, reduce a cost of the soil-binding material, and makes the soil-binding material eco-friendly.

9 Claims, No Drawings

ECO-FRIENDLY HIGH-PERFORMANCE ALL-SOLID-WASTE SOIL-BINDING MATERIAL AND PREPARATION METHOD AND USE METHOD THEREOF

CROSS-REFERENCE TO RELATED APPLICATION

The present application claims priority from Chinese Patent Application No. 202311495439.1 filed on Nov. 10, 2023, the contents of which are incorporated herein by reference in their entirety.

TECHNICAL FIELD

The present disclosure relates to the field of weak soil solidifying agents, and in particular to an eco-friendly high-performance all-solid-waste soil-binding material and a preparation method and use method thereof.

BACKGROUND

Guangdong is located in the alluvial-proluvial plain of the Pearl River Delta. In Guangdong, the mucky weak soil with a high organic matter content is widely distributed due to marine sedimentation. For deep silts and shallow weak soils, mixing piles need to be used to in situ solidify weak soil such as soil base course, thereby reducing the sedimentation after construction and improving the stability and durability of a road foundation.

Currently, cement is usually used as a solidifying material for the solidification of a weak soil. However, when the cement is used for mucky soil with a high organic matter content and a high moisture content, organic acids resulting from the decomposition of organic matters will destroy cement hydration products, and the high moisture content and a high porosity ratio will further weaken a solidifying effect of the cement. Therefore, it has been widely proven that the cement exhibits a poor solidifying effect when used for solidifying a weak soil foundation. In a project, a cement addition amount is usually increased to improve a piling effect of a mixing pile. However, in this case, an improvement effect is limited, and a project cost is significantly increased.

SUMMARY

A first technical problem to be solved by the present disclosure is to provide an eco-friendly high-performance all-solid-waste soil-binding material. The soil-binding material exhibits a prominent solidifying effect, is eco-friendly, and has a low cost.

A second technical problem to be solved by the present disclosure is to provide a preparation method of the eco-friendly high-performance all-solid-waste soil-binding material.

A third technical problem to be solved by the present disclosure is to provide a use method of the eco-friendly high-performance all-solid-waste soil-binding material.

To solve the above technical problems, the present disclosure provides an eco-friendly high-performance all-solid-waste soil-binding material, including the following components in parts by weight: a slag powder: 30 parts to 60 parts, a fly ash: 10 parts to 25 parts, a steel-slag powder: 10 parts to 30 parts, an alkaline residue powder: 5 parts to 15 parts, and a lithium-battery solid waste: 5 parts to 15 parts, where main mineral components of the alkaline residue powder are calcium carbonate, calcium sulfate, and calcium chloride; a main mineral component of the lithium-battery solid waste is sodium sulfate; and a sum of parts by weight of the slag powder, the fly ash, the steel-slag powder, the alkaline residue powder, and the lithium-battery solid waste is 100 parts.

As an improvement of the above technical solution, the slag powder is an S95-grade slag powder or an S105-grade slag powder;
the fly ash is a grade I fly ash or a grade II fly ash; and
the steel-slag powder is a grade I steel-slag powder or a grade II steel-slag powder.

As an improvement of the above technical solution, an activity index of the slag powder is higher than or equal to 95%, an activity index of the fly ash is higher than or equal to 70%, and an activity index of the steel-slag powder is higher than or equal to 65%.

As an improvement of the above technical solution, a moisture content of the alkaline residue powder is higher than or equal to 20 wt %, and a moisture content of the lithium-battery solid waste is higher than or equal to 10 wt %.

As an improvement of the above technical solution, the lithium-battery solid waste is a waste residue produced in a recycling process of a waste lithium battery, and a total content of Ni, Mn, and Co in the lithium-battery solid waste is 1 mg/g to 25 mg/g.

As an improvement of the above technical solution, a chemical composition of the alkaline residue powder conforms to the following relationships:

$$LOI_{1300}/LOI_{1000} = 1.22-1.45$$

$$w_{MgO}/(w_{Na_2O} + LOI_{1300}) = 0.2-0.4$$

where $LOI_{1300}$ represents a mass loss rate of an absolutely-dry alkaline residue powder after being burned at 1,300° C. to a constant weight, $LOI_{1000}$ represents a mass loss rate of the absolutely-dry alkaline residue powder after being burned at 1,000° C. to a constant weight, $w_{MgO}$ represents a MgO content in the absolutely-dry alkaline residue powder that is determined by inductively coupled plasma (ICP) analysis, and $W_{Na_2O}$ represents a Na₂O content in the absolutely-dry alkaline residue powder that is determined by ICP analysis.

Correspondingly, the present disclosure also discloses a preparation method of an eco-friendly high-performance all-solid-waste soil-binding material, where the preparation method is used to prepare the eco-friendly high-performance all-solid-waste soil-binding material described above, and includes:
providing a slag powder, a fly ash, a steel-slag powder, an alkaline residue powder, and a lithium-battery solid waste, and packaging the slag powder, the fly ash, the steel-slag powder, the alkaline residue powder, and the lithium-battery solid waste separately; or
providing and mixing the alkaline residue powder and the lithium-battery solid waste to obtain a first mixture; providing and mixing the slag powder, the fly ash, and the steel-slag powder to obtain a second mixture; and packaging the first mixture and the second mixture separately.

Correspondingly, the present disclosure also discloses a use method of an eco-friendly high-performance all-solid-waste soil-binding material, where the use method is used to use the eco-friendly high-performance all-solid-waste soil-binding material described above, and includes:
arranging a first slurry pool, and adding an alkaline residue powder, a lithium-battery solid waste, and a first preset amount of water to the first slurry pool to prepare a first slurry with a first moisture content;
arranging a second slurry pool, and adding a slag powder, a fly ash, a steel-slag powder, and a second preset amount of water to the second slurry pool to prepare a second slurry with a second moisture content;
mixing the first slurry and the second slurry thoroughly to obtain a third slurry; and
mixing the third slurry with a soil to be solidified by a mixing pile machine.

Correspondingly, the present disclosure also discloses a use method of an eco-friendly high-performance all-solid-waste soil-binding material, where the use method is used to use the eco-friendly high-performance all-solid-waste soil-binding material described above, and includes:
arranging a first slurry pool, and adding a mixture of an alkaline residue powder and a lithium-battery solid waste and a first preset amount of water to the first slurry pool to prepare a first slurry with a first moisture content;
arranging a second slurry pool, and adding a mixture of a slag powder, a fly ash, and a steel-slag powder and a second preset amount of water to the second slurry pool to prepare a second slurry with a second moisture content;
mixing the first slurry and the second slurry thoroughly to obtain a third slurry; and
mixing the third slurry with a soil to be solidified by a mixing pile machine.

As an improvement of the above technical solution, the first moisture content is 60%, and the second moisture content is 60%.

The implementation of the present disclosure has the following beneficial effects:

1. The eco-friendly high-performance all-solid-waste soil-binding material of the present disclosure includes 30 parts to 60 parts of a slag powder, 10 parts to 25 parts of a fly ash, 10 parts to 30 parts of a steel-slag powder, 5 parts to 15 parts of an alkaline residue powder, and 5 parts to 15 parts of a lithium-battery solid waste, which all are solid waste materials. The use of the above solid waste materials instead of a cement for weak soil solidification can significantly reduce carbon emissions and is eco-friendly. The active and effective components of the slag powder, the fly ash, and the steel-slag powder are distributed in a gradient manner. The amounts of the slag powder, the fly ash, and the steel-slag powder can be adjusted to effectively improve a solidification strength and regulate a strength grade of the soil-binding material. The main mineral components of the alkaline residue powder are calcium carbonate, calcium sulfate, and calcium chloride, and the main mineral component of the lithium-battery solid waste is sodium sulfate. Sulfate ions of the alkaline residue powder and the lithium-battery solid waste can chemically react with a silicon-oxygen tetrahedron, an aluminum-oxygen tetrahedron, or the like in other materials to produce a large amount of needle and rod-like ettringite, which can cause a volume expansion to fill abundant pores of a weak soil and thus improves a strength of a solidified soil. In addition, the residual alkali in the alkaline residue powder can serve as an alkaline activator to dissolve effective components such as glassy phases of silicon-oxygen tetrahedra and aluminum-oxygen tetrahedra in the slag powder, the fly ash, and the steel-slag powder, such that a corresponding admixture (the slag powder, the fly ash, and the steel-slag powder) has a prominent binding effect and strength. In summary, the eco-friendly high-performance all-solid-waste soil-binding material of the present disclosure effectively improves a binding effect with a weak soil and a solidification strength, reduces a cost, and allows environmental friendliness and energy conservation.

2. The lithium-battery solid waste adopted for the eco-friendly high-performance all-solid-waste soil-binding material of the present disclosure is a solid waste produced in a recycling process of a waste lithium battery. A total content of Ni, Mn, and Co in the lithium-battery solid waste is 1 mg/g to 25 mg/g. The introduction of the alkaline residue powder with a specific composition can not only improve a solidification strength of the soil-binding material, but also allow the solidification of heavy metals in the lithium-battery solid waste to avoid environmental hazards.

3. The alkaline residue powder and the lithium-battery solid waste adopted for the eco-friendly high-performance all-solid-waste soil-binding material of the present disclosure have high moisture contents. If the alkaline residue powder and the lithium-battery solid waste are first oven-dried and then mixed with the admixture above, because calcium chloride and sodium sulfate are easy to absorb water in the air, the soil-binding material produced is susceptible to moisture deterioration and cannot be stored for a long time. In both the preparation method and the use method mentioned in the present disclosure, an oven-drying step is avoided, which can reduce a cost of the soil-binding material, and can also solve the problem that a soil-binding material including an alkaline material is susceptible to dampness and cannot be stored for a long time.

DETAILED DESCRIPTION

To make the objectives, technical solutions, and advantages of the present disclosure clear, the present disclosure will be further described in detail below in combination with specific embodiments.

The present disclosure provides an eco-friendly high-performance all-solid-waste soil-binding material, including the following components in parts by weight:
a slag powder: 30 parts to 60 parts, a fly ash: 10 parts to 25 parts, a steel-slag powder: 10 parts to 30 parts, an alkaline residue powder: 5 parts to 15 parts, and a lithium-battery solid waste: 5 parts to 15 parts.

The slag powder is a powder material obtained by grinding a granulated blast furnace slag to a specified fineness degree. The slag powder has a high potential activity, and can undergo a hydration reaction under alkaline excitation conditions to improve a solidification strength. Specifically, in the formula of the eco-friendly high-performance all-solid-waste soil-binding material of the present disclosure, a grade of the slag powder is no less than S95. Specifically, the slag powder can be an S95-grade slag powder or an S105-grade slag powder, but the present disclosure is not limited thereto. A 28 d activity index of the slag powder is higher than or equal to 95% (a determination method can be seen in GB/T 18046-2017), such as 95.5%, 97%, or 98%, but the present disclosure is not limited thereto.

The slag powder can be used in 30 parts to 60 parts, such as 35 parts, 40 parts, 45 parts, 50 parts, or 55 parts, but the present disclosure is not limited thereto.

The fly ash is a solid waste collected from a flue gas produced after coal combustion. The fly ash includes Si—Al—Na(K)-Caglassy phases, has a strong activity, and can serve as a silicon source and a calcium source to participate in a hydration reaction to produce hydrated calcium silicate. In addition, the glassy phases can be corroded by the alkaline residue powder, and then react with sulfate ions in the alkaline residue powder and the lithium-battery solid waste to produce needle and rod-like ettringite, thereby improving a solidification strength. Specifically, in the formula of the eco-friendly high-performance all-solid-waste soil-binding material of the present disclosure, the fly ash can be a grade I fly ash or a grade II fly ash. A 28 d activity index of the fly ash is higher than or equal to 70% (a determination method can be seen in GB/T 1596-2017), such as 70.5%, 72%, 74%, 76%, or 80%, but the present disclosure is not limited thereto.

The fly ash can be used in 10 parts to 25 parts, such as 12 parts, 15 parts, 18 parts, 21 parts, or 24 parts, but the present disclosure is not limited thereto.

The steel-slag powder is a powder produced by grinding a waste slag produced in an ironmaking process of a converter or an electric furnace. The steel-slag powder includes a silicate and a ferrate, and has a specified activity. Specifically, in the eco-friendly high-performance all-solid-waste soil-binding material of the present disclosure, the steel-slag powder is a grade I steel-slag powder or a grade II steel-slag powder, but the present disclosure is not limited thereto. A 28 d activity index of the steel-slag powder is higher than or equal to 65% (a determination method can be seen in GB/T 20491-2017), such as 67%, 69%, or 71%, but the present disclosure is not limited thereto.

The steel-slag powder can be used in 10 parts to 30 parts, such as 12 parts, 15 parts, 18 parts, 21 parts, or 24 parts, but the present disclosure is not limited thereto.

The alkaline residue powder is a by-product generated in a soda ash preparation process. Main components of the alkaline residue powder are calcium carbonate, calcium sulfate, calcium chloride, or the like. The alkaline residue powder includes fine particles with a particle size of 2 μm to 20 μm. In the alkaline residue powder, calcium carbonate fine particles can fill the internal pores of a soil solidified by the soil-binding material, and coarse particles serve as a framework for a soil solidified by the soil-binding material, which can improve the structural compactness and the overall strength. Calcium chloride can stimulate the hydration of the steel-slag powder and the slag powder to produce hydrated calcium silicate to cement soil particles, thereby improving a strength of a solidified soil. The calcium sulfate and other free calcium in the alkaline residue powder can also react with sulfate ions in the lithium-battery solid waste and calcium silicate produced after the hydration of the steel-slag powder and the slag powder to produce ettringite, which causes a volume expansion to further improve the compactness of a solidified soil. The residual alkali in the alkaline residue powder can serve as an alkaline activator to dissolve effective components such as glassy phases of silicon-oxygen tetrahedra and aluminum-oxygen tetrahedra in an admixture (the slag powder, the fly ash, and the steel-slag powder), such that the admixture has a prominent binding effect and strength. The residual alkali in the alkaline residue powder can also react with heavy metal ions such as cobalt, nickel, and manganese ions remaining in the lithium-battery solid waste to produce solid hydroxides, and these solid heavy metal hydroxides can be solidified and encapsulated when a soil is solidified by the soil-binding material, such that the environment will not be polluted. Specifically, the alkaline residue powder can be used in 5 parts to 15 parts, such as 6 parts, 7.5 parts, 9 parts, 10.5 parts, 12 parts, or 13.5 parts, but the present disclosure is not limited thereto.

Preferably, in an embodiment of the present disclosure, a chemical composition of the alkaline residue powder conforms to the following relationships:

$$LOI_{1300}/LOI_{1000} = 1.22 - 1.45$$

where $LOI_{1300}$ represents a mass loss rate of an absolutely-dry alkaline residue powder after being burned at 1,300° C. to a constant weight and $LOI_{1000}$ represents a mass loss rate of the absolutely-dry alkaline residue powder after being burned at 1,000° C. to a constant weight, where the absolutely-dry alkaline residue powder is obtained by drying the alkaline residue powder at 50° C. to 120° C. to a constant weight. In the alkaline residue powder based on this chemical composition, a content of the mineral component calcium sulfate is relatively high, which can effectively increase a content of ettringite produced after solidification and effectively improve a solidification strength.

Preferably, in an embodiment of the present disclosure, a chemical composition of the alkaline residue powder conforms to the following relationships:

$$w_{MgO}/(w_{Na_2O} + LOI_{1300}) = 0.2 - 0.4$$

where $LOI_{1300}$ represents a mass loss rate of an absolutely-dry alkaline residue powder after being burned at 1,300° C. to a constant weight, $w_{MgO}$ represents a MgO content in the absolutely-dry alkaline residue powder that is determined by ICP analysis, and $w_{Na_2O}$ represents a $Na_2O$ content in the absolutely-dry alkaline residue powder that is determined by ICP analysis. The alkaline residue powder based on this chemical composition has a high free alkali content, which can ensure the effective excitation of other raw materials and improve a solidification strength. In addition, there can be enough alkali to achieve the immobilization of heavy metals in the lithium-battery solid waste, which can increase the consumption of the lithium-battery solid waste, increase a content of ettringite produced after solidification, and effectively improve a solidification strength.

Because there are some free Cl ions in the alkaline residue powder, the alkaline residue powder generally does not cause a damage to a steel product in contact with the alkaline residue powder under alkaline conditions. However, if a large amount of an alkali is immobilized and neutralized, the free Cl ions can corrode the steel product, which limits an application scope of the soil-binding material in the present disclosure. The inventors of the present disclosure have found through a large number of studies that free alkalies mostly exist in the $Mg(OH)_2$ phase and free chloride ions mostly exist in the NaCl and $CaCl_2$ phases in the alkaline residue powder, and through the joint control of MgO, $Na_2O$, and $LOI_{1300}$, a content of the free alkalies and a content of the free Cl ions can be effectively controlled to solve the corrosion problem.

A moisture content of the alkaline residue powder is higher than or equal to 20 wt % and preferably 20 wt % to 40 wt %. Based on the preparation method and the use method of the present disclosure, the alkaline residue powder can be effectively utilized without dehydration and drying.

The lithium-battery solid waste refers to a waste residue with sodium sulfate as a main mineral component that is generated in a production process of a cathode material of a lithium battery or in a recycling process of a waste lithium battery. Preferably, in an embodiment of the present disclosure, the lithium-battery solid waste is a waste residue produced in a recycling process of a waste lithium battery, which is limited by a later recycling process. Such a lithium-battery solid waste often includes some heavy metals, such as Ni, Mn, and Co (which exist in the form of a sulfate). Specifically, a total content of Ni, Mn, and Co is 1 mg/g to 25 mg/g. In the present disclosure, the alkaline residue powder is introduced to allow the immobilization of these heavy metals, such that an environmental pollution can be avoided, sulfate ions bound with these heavy metals are released, and ettringite is produced after solidification to improve a solidification strength.

The lithium-battery solid waste can be used in 5 parts to 15 parts, such as 6 parts, 8 parts, 10 parts, 12 parts, or 14 parts. Preferably, through the control of the chemical composition of the alkaline residue powder, the amount of the lithium-battery solid waste can be increased to 10 parts to 15 parts.

A moisture content of the lithium-battery solid waste is higher than or equal to 10 wt % and preferably 10 wt % to 30 wt %. Based on the preparation method and the use method of the present disclosure, the lithium-battery solid waste can be effectively utilized without dehydration and drying.

Correspondingly, the present disclosure also discloses a preparation method of an eco-friendly high-performance all-solid-waste soil-binding material, including: A slag powder, a fly ash, a steel-slag powder, an alkaline residue powder, and a lithium-battery solid waste are provided and packaged separately. Or, the alkaline residue powder and the lithium-battery solid waste are provided and mixed to obtain a first mixture, the slag powder, the fly ash, and the steel-slag powder are provided and mixed to obtain a second mixture, and the first mixture and the second mixture are packaged separately.

Correspondingly, the present disclosure also discloses a use method of an eco-friendly high-performance all-solid-waste soil-binding material, including the following steps:
(1) A first slurry pool is arranged, and an alkaline residue powder, a lithium-battery solid waste, and a first preset amount of water are added to the first slurry pool to prepare a first slurry with a first moisture content. The first moisture content is 45% to 65% and preferably 60%.
(2) A second slurry pool is arranged, and a slag powder, a fly ash, a steel-slag powder, and a second preset amount of water are added to the second slurry pool to prepare a second slurry with a second moisture content. The second moisture content is 45% to 65% and preferably 60%.
(3) The first slurry and the second slurry are mixed thoroughly to obtain a third slurry.

The first slurry and the second slurry can be mixed in the second slurry pool. A third slurry pool can be additionally arranged, and the first slurry and the second slurry can be mixed in the third slurry pool.
(4) The third slurry is mixed with a soil to be solidified by a mixing pile machine.

Correspondingly, the present disclosure also discloses another use method of an eco-friendly high-performance all-solid-waste soil-binding material, including the following steps:
(1) A first slurry pool is arranged, and a mixture of an alkaline residue powder and a lithium-battery solid waste and a first preset amount of water are added to the first slurry pool to prepare a first slurry with a first moisture content. The first moisture content is 45% to 65% and preferably 60%.
(2) A second slurry pool is arranged, and a mixture of a slag powder, a fly ash, and a steel-slag powder and a second preset amount of water are added to the second slurry pool to prepare a second slurry with a second moisture content. The second moisture content is 45% to 65% and preferably 60%.
(3) The first slurry and the second slurry are mixed thoroughly to obtain a third slurry.

The first slurry and the second slurry can be mixed in the second slurry pool. A third slurry pool can be additionally arranged, and the first slurry and the second slurry can be mixed in the third slurry pool.
(4) The third slurry is mixed with a soil to be solidified by a mixing pile machine.

The present disclosure is described below with reference to specific examples.

Properties of weak soil samples tested in each example are shown in the following table:

| No. | Item | Measured value | Remarks |
| --- | --- | --- | --- |
| 1 | Natural moisture content, % | 51.7 | Oven-drying method |
| 2 | Natural density, g/cm³ | 1.73 | Cutting ring method |
| 3 | Dry density, g/cm³ | 1.56 | Cutting ring method |
| 4 | Saturation, % | 90.12 | |
| 5 | Porosity, % | 40.07 | |
| 6 | Liquid limit, % | 48.15 | 76 g cone, 10 mm, liquid-plastic limit combined method |
| 7 | Plastic limit, % | 30.74 | |
| 8 | Plasticity index | 17.41 | |
| 9 | Cohesion, kPa | 12.36 | Direct quick shear test |
| 10 | Friction angle, ° | 8.41 | |

Example 1

An eco-friendly high-performance all-solid-waste soil-binding material was provided in this example. A formula of the soil-binding material was as follows:
an S95-grade slag powder: 45 parts, a grade I class F fly ash: 20 parts, a grade I steel-slag powder: 15 parts, an alkaline residue powder: 10 parts, and a lithium-battery solid waste: 10 parts.

A 28 d activity index of the S95-grade slag powder was 98.5%, a 28 d activity index of the grade I class F fly ash was 73%, and a 28 d activity index of the grade I steel-slag powder was 67%. The lithium-battery solid waste was a waste residue produced in a recycling process of a waste lithium battery. In the lithium-battery solid waste, a total content of Ni, Mn, and Co was 23.4 mg/g, and a moisture content was 16.3 wt %.

The alkaline residue powder had a moisture content of 28.5 wt %, $LOI_{1300}$ of 21.9 wt %, $LOI_{1000}$ of 15.9 wt %, $w_{MgO}$ of 7.82 wt %, and $w_{Na2O}$ of 4.12 wt %.

Example 2

An eco-friendly high-performance all-solid-waste soil-binding material was provided in this example. A formula of the soil-binding material was as follows:
an S95-grade slag powder: 45 parts, a grade I class F fly ash: 20 parts, a grade I steel-slag powder: 15 parts, an alkaline residue powder: 10 parts, and a lithium-battery solid waste: 10 parts.

A 28 d activity index of the S95-grade slag powder was 98.5%, a 28 d activity index of the grade I class F fly ash was 73%, and a 28 d activity index of the grade I steel-slag powder was 67%. The lithium-battery solid waste was a waste residue produced in a recycling process of a waste lithium battery. In the lithium-battery solid waste, a total content of Ni, Mn, and Co was 23.4 mg/g, and a moisture content was 16.3 wt %.

The alkaline residue powder had a moisture content of 31.3 wt %, $LOI_{1300}$ of 26.75 wt %, $LOI_{1000}$ of 20.61 wt %, $w_{MgO}$ of 6.5 wt %, and $w_{Na2O}$ of 7.23 wt %.

Example 3

An eco-friendly high-performance all-solid-waste soil-binding material was provided in this example. A formula of the soil-binding material was as follows:
an S95-grade slag powder: 45 parts, a grade I class F fly ash: 20 parts, a grade I steel-slag powder: 15 parts, an alkaline residue powder: 10 parts, and a lithium-battery solid waste: 10 parts.

A 28 d activity index of the S95-grade slag powder was 98.5%, a 28 d activity index of the grade I class F fly ash was 73%, and a 28 d activity index of the grade I steel-slag powder was 67%. The lithium-battery solid waste was a waste residue produced in a recycling process of a waste lithium battery. In the lithium-battery solid waste, a total content of Ni, Mn, and Co was 23.4 mg/g, and a moisture content was 16.3 wt %.

The alkaline residue powder had a moisture content of 35.4 wt %, $LOI_{1300}$ of 19.4 wt %, $LOI_{1000}$ of 16.3 wt %, $w_{MgO}$ of 9.24 wt %, and $w_{Na2O}$ of 8.15 wt %.

Example 4

An eco-friendly high-performance all-solid-waste soil-binding material was provided in this example. A formula of the soil-binding material was as follows:
an S95-grade slag powder: 45 parts, a grade I class F fly ash: 20 parts, a grade I steel-slag powder: 15 parts, an alkaline residue powder: 10 parts, and a lithium-battery solid waste: 10 parts.

A 28 d activity index of the S95-grade slag powder was 98.5%, a 28 d activity index of the grade I class F fly ash was 73%, and a 28 d activity index of the grade I steel-slag powder was 67%. The lithium-battery solid waste was a waste residue produced in a recycling process of a waste lithium battery. In the lithium-battery solid waste, a total content of Ni, Mn, and Co was 23.4 mg/g, and a moisture content was 16.3 wt %.

The alkaline residue powder had a moisture content of 23.5 wt %, $LOI_{1300}$ of 22.5 wt %, $LOI_{1000}$ of 18.6 wt %, $w_{MgO}$ of 3.23 wt %, and $w_{Na2O}$ of 5.12 wt %.

Comparative Example 1

An S95-grade slag powder: 60 parts, a grade I class F fly ash: 20 parts, a grade I steel-slag powder: 10 parts, and a lithium-battery solid waste: 10 parts.

A 28 d activity index of the S95-grade slag powder was 98.5%, a 28 d activity index of the grade I class F fly ash was 73%, and a 28 d activity index of the grade I steel-slag powder was 67%. The lithium-battery solid waste was a waste residue produced in a recycling process of a waste lithium battery. In the lithium-battery solid waste, a total content of Ni, Mn, and Co was 23.4 mg/g, and a moisture content was 16.3 wt %.

Comparative Example 2

An S95-grade slag powder: 60 parts, a grade I class F fly ash: 20 parts, a grade I steel-slag powder: 10 parts, and an alkaline residue powder: 10 parts.

A 28 d activity index of the S95-grade slag powder was 98.5%, a 28 d activity index of the grade I class F fly ash was 73%, and a 28 d activity index of the grade I steel-slag powder was 67%.

The alkaline residue powder had a moisture content of 31.3 wt %, $LOI_{1300}$ of 26.75 wt %, $LOI_{1000}$ of 20.61 wt %, $w_{MgO}$ of 6.5 wt %, and $w_{Na2O}$ of 7.2 wt %.

Comparative Example 3

An S95-grade slag powder: 60 parts, a grade I class F fly ash: 20 parts, and a grade I steel-slag powder: 20 parts.

A 28 d activity index of the S95-grade slag powder was 98.5%, a 28 d activity index of the grade I class F fly ash was 73%, and a 28 d activity index of the grade I steel-slag powder was 67%.

The soil-binding materials in Examples 1 to 4 and Comparative Examples 1 to 3 each were mixed thoroughly with water according to a water/soil-binding material ratio of 0.6 and then mixed with a weak soil sample (according to a proportion of 15%), and solidification was conducted for 28 d. Then, the properties each were determined. Specific test results are shown in the following table:

| Performance indexes | Example 1 | Example 2 | Example 3 | Example 4 | Comparative Example 1 | Comparative Example 2 | Comparative Example 3 |
|---|---|---|---|---|---|---|---|
| Unconfined compressive strength/(MPa, 28 d) | 2.9 | 1.9 | 1.6 | 1.7 | 0.9 | 1.1 | 0.4 |
| Permeability coefficient/($\times 10^{-6}$ cm/s, 28 d) | 1.04 | 2.13 | 2.41 | 2.75 | 4.76 | 3.92 | 9.21 |
| Unconfined | 8.75 | 11.74 | 14.03 | 16.24 | 55.67 | 31.42 | 95.41 |

| Performance indexes | Example 1 | Example 2 | Example 3 | Example 4 | Comparative Example 1 | Comparative Example 2 | Comparative Example 3 |
|---|---|---|---|---|---|---|---|
| compressive strength loss rate under freeze-thaw cycles/(%, 15 cycles) | | | | | | | |

Notes:
An unconfined compressive strength is tested according to the "Specification for Mix Proportion Design of Cement Soil" JGJ/T 233. A permeability coefficient test and a freeze-thaw cycle test are conducted with reference to the "Test Methods of Soils for Highway Engineering" (JTG 3430-2020).

The above are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

The invention claimed is:

1. An eco-friendly high-performance all-solid-waste soil-binding material, comprising the following components in parts by weight: a slag powder: 30 parts to 60 parts, a fly ash: 10 parts to 25 parts, a steel-slag powder: 10 parts to 30 parts, an alkaline residue powder: 5 parts to 15 parts, and a lithium-battery solid waste: 5 parts to 15 parts, wherein main mineral components of the alkaline residue powder are calcium carbonate, calcium sulfate, and calcium chloride; the lithium-battery solid waste is a waste residue produced in a recycling process of a waste lithium battery, a main mineral component of the lithium-battery solid waste is sodium sulfate, and a total content of Ni, Mn, and Co in the lithium-battery solid waste is 1 mg/g to 25 mg/g;

a sum of parts by weight of the slag powder, the fly ash, the steel-slag powder, the alkaline residue powder, and the lithium-battery solid waste is 100 parts; and a chemical composition of the alkaline residue powder conforms to the following relationships:

$$LOI_{1300}/LOI_{1000} = 1.22 - 1.45$$

$$w_{MgO}/(w_{Na_2O} + LOI_{1300}) = 0.2 - 0.4$$

wherein $LOI_{1300}$ represents a mass loss rate of an absolutely-dry alkaline residue powder after being burned at 1,300° C. to a constant weight, $LOI_{1000}$ represents a mass loss rate of the absolutely-dry alkaline residue powder after being burned at 1,000° C. to a constant weight, $w_{MgO}$ represents a MgO content in the absolutely-dry alkaline residue powder that is determined by inductively coupled plasma (ICP) analysis, and $w_{Na_2O}$ represents a $Na_2O$ content in the absolutely-dry alkaline residue powder that is determined by ICP analysis.

2. The eco-friendly high-performance all-solid-waste soil-binding material according to claim 1, wherein the slag powder is an S95-grade slag powder or an S105-grade slag powder;

the fly ash is a grade I fly ash or a grade II fly ash; and
the steel-slag powder is a grade I steel-slag powder or a grade II steel-slag powder.

3. The eco-friendly high-performance all-solid-waste soil-binding material according to claim 1, wherein an activity index of the slag powder is higher than or equal to 95%, an activity index of the fly ash is higher than or equal to 70%, and an activity index of the steel-slag powder is higher than or equal to 65%.

4. The eco-friendly high-performance all-solid-waste soil-binding material according to claim 1, wherein a moisture content of the alkaline residue powder is higher than or equal to 20 wt %, and a moisture content of the lithium-battery solid waste is higher than or equal to 10 wt %.

5. A preparation method of an eco-friendly high-performance all-solid-waste soil-binding material, wherein the preparation method is used to prepare the eco-friendly high-performance all-solid-waste soil-binding material according to claim 1, and comprises:

providing a slag powder, a fly ash, a steel-slag powder, an alkaline residue powder, and a lithium-battery solid waste, and packaging the slag powder, the fly ash, the steel-slag powder, the alkaline residue powder, and the lithium-battery solid waste separately; or providing and mixing the alkaline residue powder and the lithium-battery solid waste to obtain a first mixture; providing and mixing the slag powder, the fly ash, and the steel-slag powder to obtain a second mixture; and packaging the first mixture and the second mixture separately.

6. A use method of an eco-friendly high-performance all-solid-waste soil-binding material, wherein the use method is used to use the eco-friendly high-performance all-solid-waste soil-binding material according to claim 1, and comprises:

arranging a first slurry pool, and adding an alkaline residue powder, a lithium-battery solid waste, and a first preset amount of water to the first slurry pool to prepare a first slurry with a first moisture content;

arranging a second slurry pool, and adding a slag powder, a fly ash, a steel-slag powder, and a second preset amount of water to the second slurry pool to prepare a second slurry with a second moisture content;

mixing the first slurry and the second slurry thoroughly to obtain a third slurry; and mixing the third slurry with a soil to be solidified by a mixing pile machine.

7. A use method of an eco-friendly high-performance all-solid-waste soil-binding material, wherein the use method is used to use the eco-friendly high-performance all-solid-waste soil-binding material according to claim 1, and comprises:

arranging a first slurry pool, and adding a mixture of an alkaline residue powder and a lithium-battery solid waste and a first preset amount of water to the first slurry pool to prepare a first slurry with a first moisture content;

arranging a second slurry pool, and adding a mixture of a slag powder, a fly ash, and a steel-slag powder and a second preset amount of water to the second slurry pool to prepare a second slurry with a second moisture content;

mixing the first slurry and the second slurry thoroughly to obtain a third slurry; and mixing the third slurry with a soil to be solidified by a mixing pile machine.

8. The use method of an eco-friendly high-performance all-solid-waste soil-binding material according to claim 6, wherein the first moisture content is 60%; and the second moisture content is 60%.

9. The use method of an eco-friendly high-performance all-solid-waste soil-binding material according to claim 7, wherein the first moisture content is 60%; and the second moisture content is 60%.

* * * * *